(12) United States Patent
Suzuki

(10) Patent No.: US 6,609,550 B2
(45) Date of Patent: Aug. 26, 2003

(54) RUNFLAT TIRE WITH STEEL CORD BEAD REINFORCING LAYER

(75) Inventor: Kazuya Suzuki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/947,447

(22) Filed: Sep. 7, 2001

(65) Prior Publication Data

US 2002/0056499 A1 May 16, 2002

(51) Int. Cl.[7] .................. B60C 13/00; B60C 15/00; B60C 15/06; B60C 17/00
(52) U.S. Cl. .................. 152/517; 152/542; 152/546; 152/550; 152/553; 152/555
(58) Field of Search ................ 152/517, 555, 152/542, 546, 550, 553

(56) References Cited

U.S. PATENT DOCUMENTS

| 5,795,416 | A | | 8/1998 | Willard, Jr. et al. |
| 5,851,324 | A | | 12/1998 | Oare et al. |
| 5,871,600 | A | | 2/1999 | Oare et al. |
| 5,988,247 | A | | 11/1999 | Tanaka |
| 6,230,773 | B1 | * | 5/2001 | Sandstrom et al. ......... 152/517 |

FOREIGN PATENT DOCUMENTS

| EP | 0 953 462 A2 | 11/1999 |
| EP | 0 985 558 A2 | 3/2000 |
| EP | 0 953 462 A3 | 4/2001 |
| EP | 0 985 558 A3 | 5/2001 |
| WO | 98/54008 A1 | 12/1998 |

* cited by examiner

Primary Examiner—Adrienne C. Johnstone
(74) Attorney, Agent, or Firm—Birch Stewart Kolasch & Birch LLP

(57) ABSTRACT

A pneumatic tire comprises a rubber bead apex extending radially outwards from a bead core; a carcass composed of an inside carcass ply and an outside carcass ply, the inside carcass ply turned up around the bead core in each bead portion from the tire inside to the tire outside to form a pair of turned up portions and a main portion therebetween, the outside carcass ply extending to a position between the bead apex and the turned up portion; a steel cord reinforcing layer comprising an axially inner portion and an axially outer portion which extend radially outwardly from the bead core underside into the sidewall portion; the sidewall portion provided with an axially inner reinforcing rubber layer disposed axially inside the inside carcass ply's main portion, and an axially outer reinforcing rubber layer disposed between the outside carcass ply and the steel cord reinforcing layer's axially outer portion.

5 Claims, 4 Drawing Sheets

Comparative Example

RUNFLAT TIRE WITH STEEL CORD BEAD REINFORCING LAYER

The present invention relates to a runflat tire, more particularly to an improved sidewall structure being capable of reducing the tire weight.

BACKGROUND OF THE INVENTION

As an old-type runflat tire, a pneumatic tire whose sidewall portion is reinforced with a crescent-shaped thick hard rubber layer disposed axially inside the carcass is well known in the art. In case of passenger car tire sizes, such a rubber layer requires a thickness of more than 15 mm through a wide range between the tread shoulder portion and the bead portion in order to fully support tire loads when the tire is deflated. This greatly increases the tire weight, and accordingly, dynamic performance under normal running conditions deteriorates.

As a technique to increase the load supporting power of the sidewall portion, such a structure that a plurality of relatively thin crescent-shaped rubber layers are sandwiched between the carcass plies has been disclosed in for example the laid-open Japanese patent application No. 10-71807 (corresponding to U.S. Pat. No. 5,795,416).

However, it is difficult for even this structure to satisfy the recent severe requirements for tire weight reduction based on the movement towards fuel economy, resources saving and the like.

BRIEF SUMMARY OF THE INVENTION

It is therefore, an object of the present invention to provide a pneumatic tire, in which the load supporting power of the sidewall portion can be greatly improved by a combination use of reinforcing rubber layers and steel cord reinforcing layer, and thereby the tire weight can be reduced while maintaining or improving the runflat performance.

According to the present invention, a pneumatic tire comprises a tread portion, a pair of sidewall portions, a pair of bead portions each with a bead core and a bead apex therein, the bead apex made of rubber extending radially outwards from the bead core, a carcass extending between the bead portions and composed of an inside carcass ply and an outside carcass ply, the inside carcass ply extending between the bead portions through the tread portion and sidewall portions and turned up around the bead core in each bead portion from the inside to the outside of the tire so as to form a pair of turned up portions and a main portion therebetween, the outside carcass ply disposed outside the inside carcass ply and extending to a position between the bead apex and the turned up portion in each bead portion, each bead portion provided with a steel cord reinforcing layer comprising an axially inner portion and an axially outer portion which extend radially outwardly from the underside of the bead core along the axially inside and outside of the bead core, respectively, each sidewall portion provided with an axially inner reinforcing rubber layer and an axially outer reinforcing rubber layer, the axially inner reinforcing rubber layer disposed along the axially inner surface of the main portion of the inside carcass ply, the axially outer reinforcing rubber layer disposed between the outside carcass ply and the axially outer portion.

BRIEF DESCRIPTION OF THE SEVERAL VIEWS OF THE DRAWINGS

An embodiment of the present invention will now be described in detail in conjunction with the accompanying drawings.

DETAILED DESCRIPTION OF THE INVENTION

Figure 1:
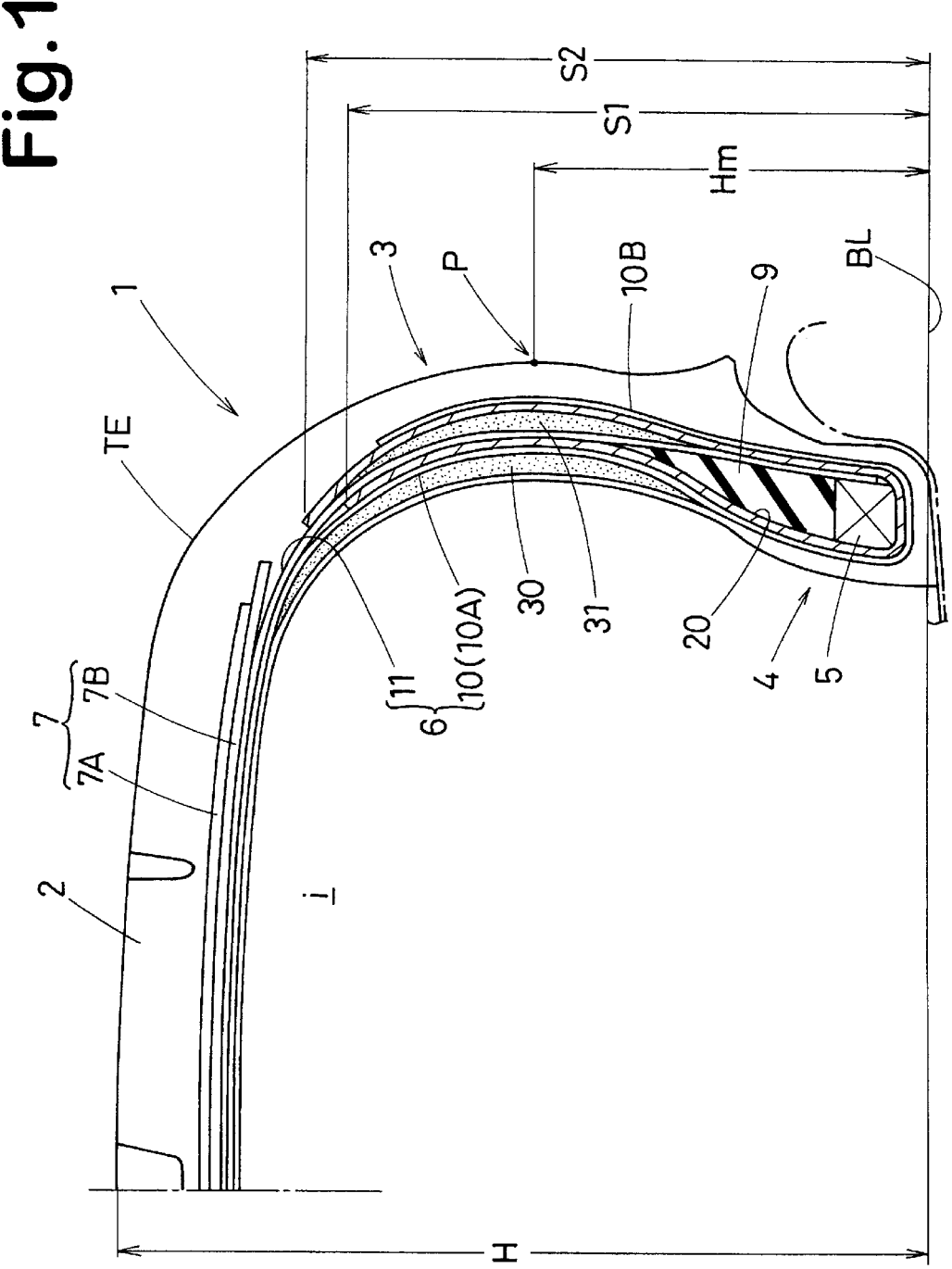
FIG. 1 is a cross sectional view of a runflat tire according to the present invention.

In the drawings, runflat tire 1 according to the present invention comprises a tread portion 2, a pair of axially spaced bead portions 4 each with a bead core 5 therein, a pair of sidewall portions 3, a carcass 6 extending between the bead portions 4, and a tread reinforcing belt 7 disposed radially outside the carcass 6 in the tread portion 2.

In FIG. 1, the runflat tire 1 has a size for passenger cars, and shown is a state of the tire mounted on a standard wheel rim and inflated to a standard pressure but loaded with no tire load (hereinafter the "normally inflated unloaded state"). In this state, the undermentioned maximum tire section width position P is defined on the outer surface of the sidewall portion. Further, the undermentioned tread edge TE is defined on the outer surface of the tread portion as the axially outmost edge of the ground contacting region in a standard loaded state of the tire mounted on the standard wheel rim and inflated to the standard pressure and loaded with a standard load. Here, the standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure. The standard load is the "maximum load capacity" in JATMA, the "Load Capacity" in ETRTO, the maximum value given in the above-mentioned table in TRA or the like.

The above-mentioned carcass 6 comprises an inside carcass ply 10 and an outside carcass ply 11.

The inside carcass ply 10 extends between the bead portions 4 and turned up around the bead core 5 in each bead portion 4 from the axially inside to the outside of the tire so as to form a main portion 10A extending from the bead core to bead core through the tread portion 2 and sidewall portions 3 and a pair of turned up portions 10B on the axially outside of the main portion 10A. The turned up portions 10B terminate within a radial height range between the tread edge TE and the maximum tire section width position P.

Each bead portion 4 is provided between the turned up portion 10B and the main portion 10A with a bead apex 9 made of a relatively hard rubber which preferably has a hardness of 80 to 96 degrees and extends radially outwards from the radially outside of the bead core 5 while tapering towards its radially outer end 9E. The "hardness" of rubber means a hardness measured with a type-A durometer according to Japanese Industrial Standard K6253.

The outside carcass ply 11 extends between the bead portions 4 along the outside of the main portion 10A of the inside carcass ply 10, passing on the axially outside of the bead apex 9 in each bead portion 4. Unlike the inside carcass ply 10, the edges of the outside carcass ply 11 are not turned up around the bead cores 5 and terminate between the bead core 5 and the turned up portion 10B so that the radial height of the radially inner end of the outside carcass ply 11 is within a radial height range between the radially outermost end and the radially innermost end of the bead core 5.

The inside and outside carcass plies 10 and 11 are each made of cords radially arranged at an angle of from 75 to 90 degrees with respect to the tire circumferential direction. For the carcass cords, organic fiber cords, e.g. nylon, polyester, rayon, aromatic polyamide and the like may be suitably used.

The belt 7 includes a breaker comprising at least two cross plies 7A and 7B of high modulus belt cords such as aromatic polyamide fiber cord, steel cord and the like which are laid at an angle of from 10 to 35 degrees with respect to the tire circumferential direction. The breaker extends across the substantially overall width of the tread portion. It is possible that the belt 7 further includes a band made of organic fiber cords, e.g. nylon and the like spirally wound on the outside of the breaker at an angle of not more than 5 degrees with respect to the tire circumferential direction.

The bead portions 4 are each provided with a steel cord reinforcing layer 20 extending into the sidewall portion 3.

The steel cord reinforcing layer 20 is made up of a base portion 20A on the radially inside of the bead core 5, an axially inner portion 20i and an axially outer portion 20o. The axially inner portion 20i extends radially outwardly from the base portion 20A, passing through on the axially inside of the bead core 5, and abutting on the axially outer surface of the main portion 10A. The axially outer portion 20o extends radially outwardly from the base portion 20A, passing through on the axially outside of the bead core 5 and between the bead apex 9 and the turned up portion 10B.

The steel cord reinforcing layer 20 is composed of a ply of parallel steel cords laid at an angle of from 15 to 55 degrees with respect to the tire circumferential direction and a cord count of from 30 to 45/5 cm. Preferably, the diameter of the steel cords is set in a range of about 0.003 to 0.010 times the section height H of the tire under the normally inflated unloaded state.

Figure 2:
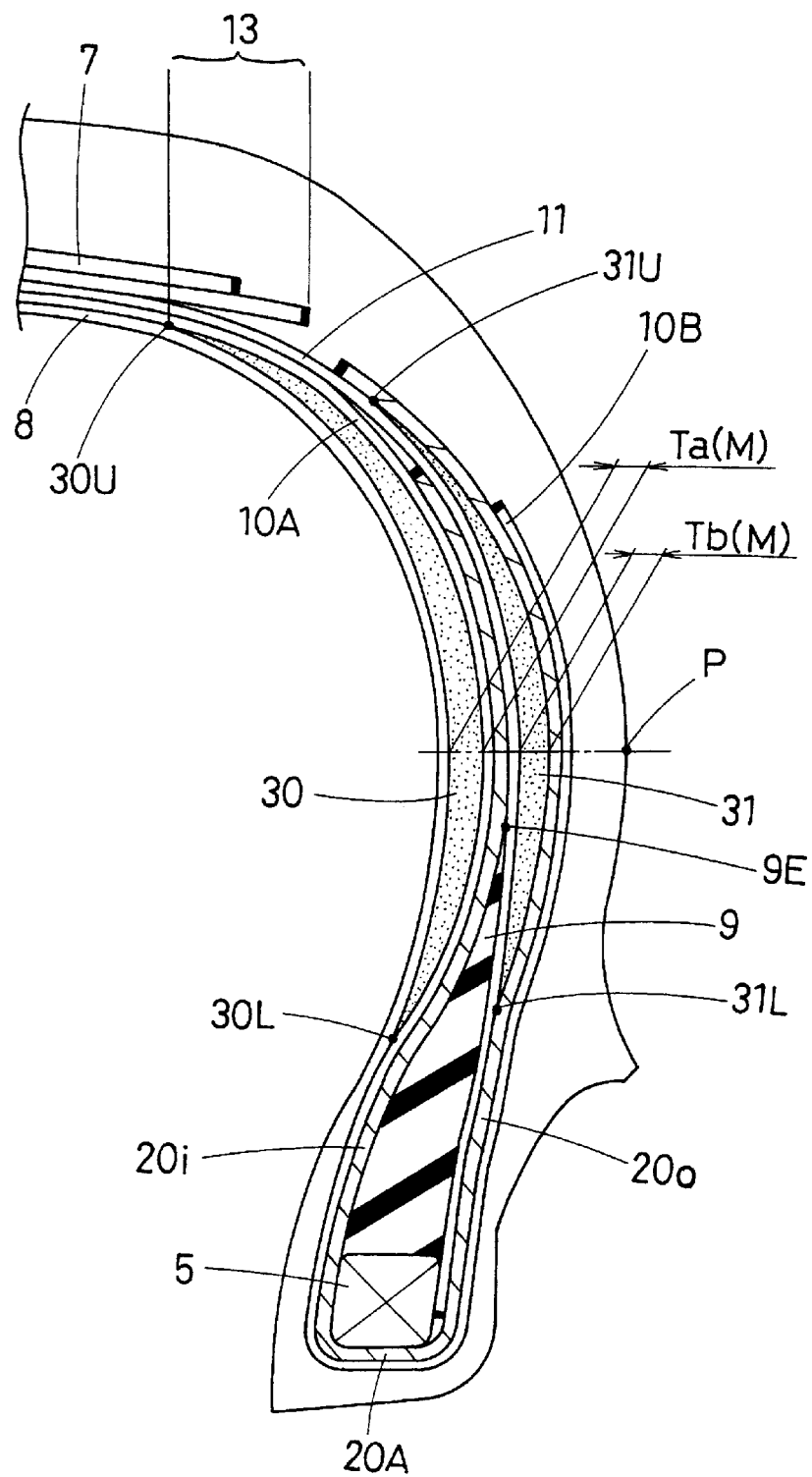
FIG. 2 is an enlarged cross sectional view showing the sidewall portion and bead portion hereof.

In the example shown in FIG. 2, the axially inner portion 20i extends radially outwardly beyond the radially outer end 9E of the bead apex 9. On the radially inside of the outer end 9E, the axially inner portion 20i abuts on the main portion 10A and the bead apex 9. On the radially outside of the outer end 9E, it abuts on the main portion 10A and the outside carcass ply 11.

The axially outer portion 20o extends radially outwardly beyond the radially outer end 9E of the bead apex 9 and further the radially outer end of the turned up portion 10B, abutting on the turned up portion 10B.

The sidewall portions 3 are each provided with an axially inner reinforcing rubber layer 30 and axially outer reinforcing rubber layer 31. The axially inner reinforcing rubber layer 30 is disposed along the axially inside of the carcass, that is, the main portion 10A of the inside carcass ply 10 in this example. The axially outer reinforcing rubber layer 31 is disposed between the outside carcass ply 11 and the axially outer portion 20o.

For the axially inner and outer reinforcing rubber layers 30 and 31, a low heat build-up rubber having a complex elastic modulus of from 7.0 to 12.0 MPa and a loss tangent of not more than 0.02 is preferably used. The complex elastic modulus and loss tangent are measured under the following condition: a temperature of 70 degrees C., a frequency of 10 Hz, a dynamic distortion of plus/minus 2%.

The axially inner and outer reinforcing rubber layers 30 and 31 each have a crescent shape tapering from a thick central portion M having a maximum thickness Ta and Tb towards the radially inner ends 30L, 31L and radially outer ends 30U, 31U thereof. The maximum thickness Ta, Tb of the central portion M is located near the radial height Hm of the maximum tire section width position P. Here, the word "near" means a radial height range between the height Hm+15% of the height H (radially outwards) and the height Hm−10% of the height H (radially inwards).

In this example, the axially inner reinforcing rubber layer 30 is disposed between the main portion 10A and an inner liner 8. The inner liner 8 is made of a gas-impermeable rubber and disposed along the inner surface of the tire, facing the tire cavity. The radially inner end 30L thereof is positioned radially inwards of the radially outer end 9E of the bead apex rubber 9. The radially outer end 30U thereof is positioned in the tread portion 2 beneath the belt 7. Thus, the axially inner reinforcing rubber layer 30 and the belt 7 overlap with each other by a certain axial width 13.

The axially outer reinforcing rubber layer 31 is disposed between the outside carcass ply 11 and the axially outer portion 20o on the axially outside thereof. The radially inner end 31L thereof is located radially inside the outer end 9E of the bead apex 9. The radially outer end 31U thereof is located axially outside the axially outer edge of the belt 7 without overlapping with the belt 7.

The above-mentioned axially outer portion 20o of the steel cord reinforcing layer 20 extends radially outwardly beyond the radially outer end 31U of the axially outer reinforcing rubber layer 31. On the radially outside of the radially outer end 31U, and on the radially inside of the radially inner end 31L, the axially outer portion 20o abuts on the outside carcass ply 11.

Accordingly, the axially outer reinforcing rubber layer 31 is completely wrapped between the axially outer portion 20o and outside carcass ply 11. Also the bead apex rubber 9 is completely wrapped between the axially inner portion 20i and outside carcass ply 11.

As to the steel cord reinforcing layer 20, if the steel cord angle is more than 55 degrees, the cord count is less than 30/5 cm, and/or the cord diameter is less than 0.003 XH, then the rigidity becomes insufficient and it is difficult to support tire loads. If the steel cord angle is less than 15 degrees, the cord count is more than 45/5 cm, and/or the cord diameter is more than 0.010 XH, then it becomes difficult to make a green tire with accuracy and further the durability is liable to decrease due to a stress concentration on the steel cords.

It is preferable that the axially inner portion 20i extends up to a radial height S1 in a range of from 1.0 to 1.5 times the radial height Hm, and the axially outer portion 20o extends up to a radial height S2 in a range of from 1.0 to 1.6 times the radial height Hm and more than the height S1. The "radial height" is a distance measured radially outwards from the bead base line BL under the normally inflated unloaded state. The bead base line BL is, as well known in the art, an axial line drawn passing a position corresponding to the nominal wheel rim diameter.

If the height S1 and/or height S2 are less than 1.0 XHm, then it is difficult to improve the runflat performance. If the height S1 is more than 1.5 XHm, the height S2 is more than 1.6 XHm, and/or the height S1 is more than the height S2, then it is difficult to decrease the tire weight.

In case of a passenger car tire size for example 225/50R16, by employing the above-mentioned structure, the total Ta+Tb of the maximum thicknesses Ta and Tb of the inner and outer reinforcing rubber layers 30 and 31 can be limited to under 12 mm, and a weight reduction of about 0.6 kg is possible.

Figure 3:
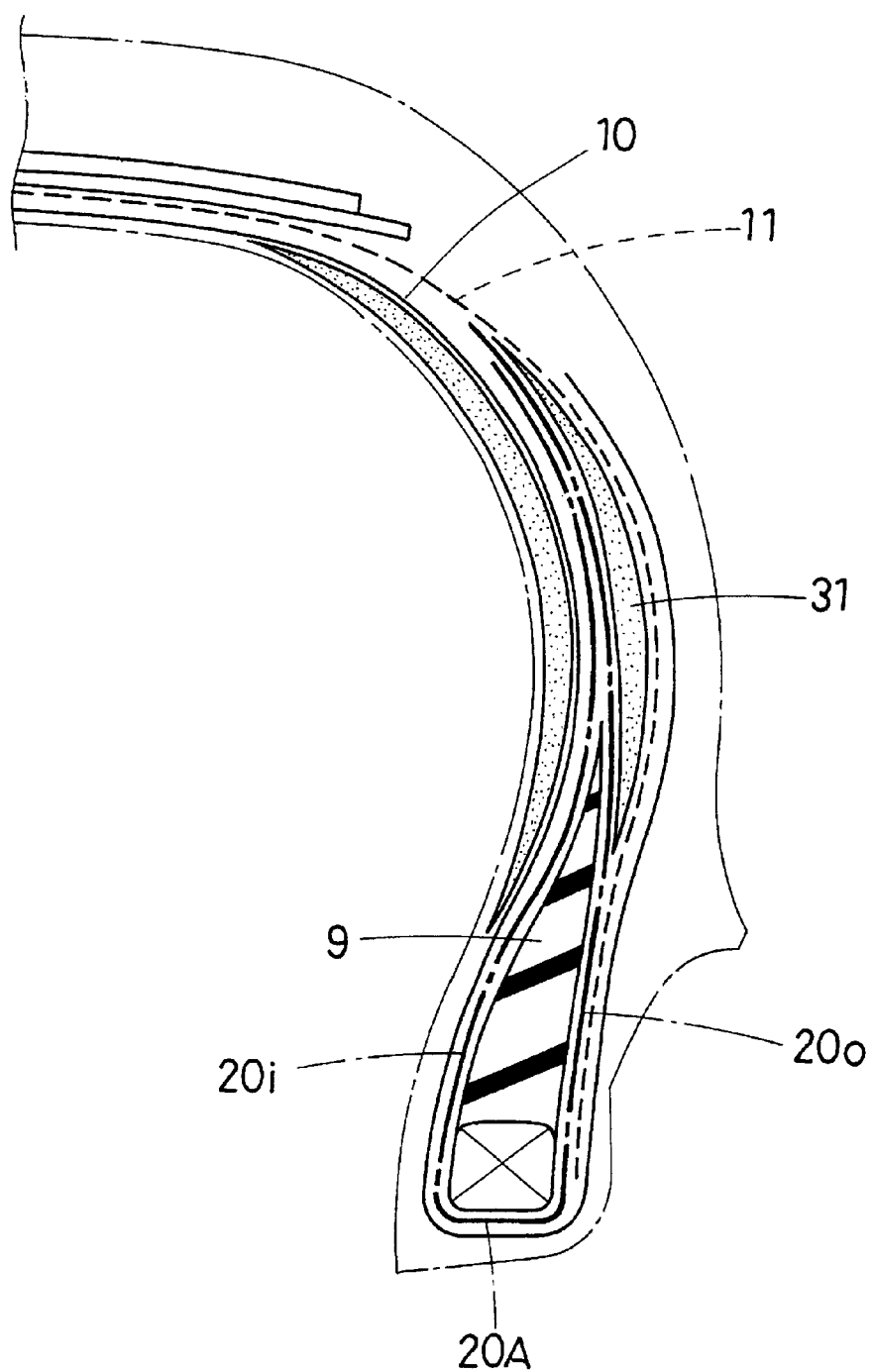
FIG. 3 is a cross sectional view of another example of the runflat tire according to the present invention.

FIG. 3 shows another embodiment of the present invention, wherein, in the sidewall portion, the relative axial positions of the axially outer portion 20o, the axially outer reinforcing rubber layer 31 and the outside carcass ply 11 are changed from the former embodiment. The rest are not changed. The above-mentioned numerical limitations for the former embodiment may be applied to this embodiment.

In this embodiment the axially outer portion 20o extends radially outwardly, abutting on the bead apex 9 and the axially outer portion 20o. The outside carcass ply 11 passes through between the axially outer portion 20o and the turned up portion 10B, abutting on the turned up portion 10B. The axially outer reinforcing rubber layer 31 is disposed between the outside carcass ply 11 and the axially outer portion 20o. In the same way as the former embodiment, on the radially outside of the radially outer end 31U, and on the radially inside of the radially inner end 31L, the axially outer portion 20o abuts on the outside carcass ply 11. Accordingly, the axially outer reinforcing rubber layer 31 is completely wrapped therebetween. The bead apex rubber 9 is also completely wrapped between the axially inner and outer portions 20i and 20o.

Comparison Test

Test tires of size 225/50R16 for passenger cars (wheel rim size:16x7JJ) having the basic structure shown in FIGS. 1 and 2 and the specifications shown in Table 1 were made and tested for runflat performance as follows.

Runflat performance test: A Japanese 2500cc FR passenger car provided on all the four wheels with test tires (the valve core of the front right tire was removed, but the other tires were normally inflated) was continuously run at a speed of 80 km/hr in a 2000 meter circuit course until the tire was broken (Max. 100 laps) to obtain the runable distance. The results are indicated in Table 1 by an index based on the reference tire being 100. The larger the index number, the better the runflat performance.

TABLE 1

Figure 4:
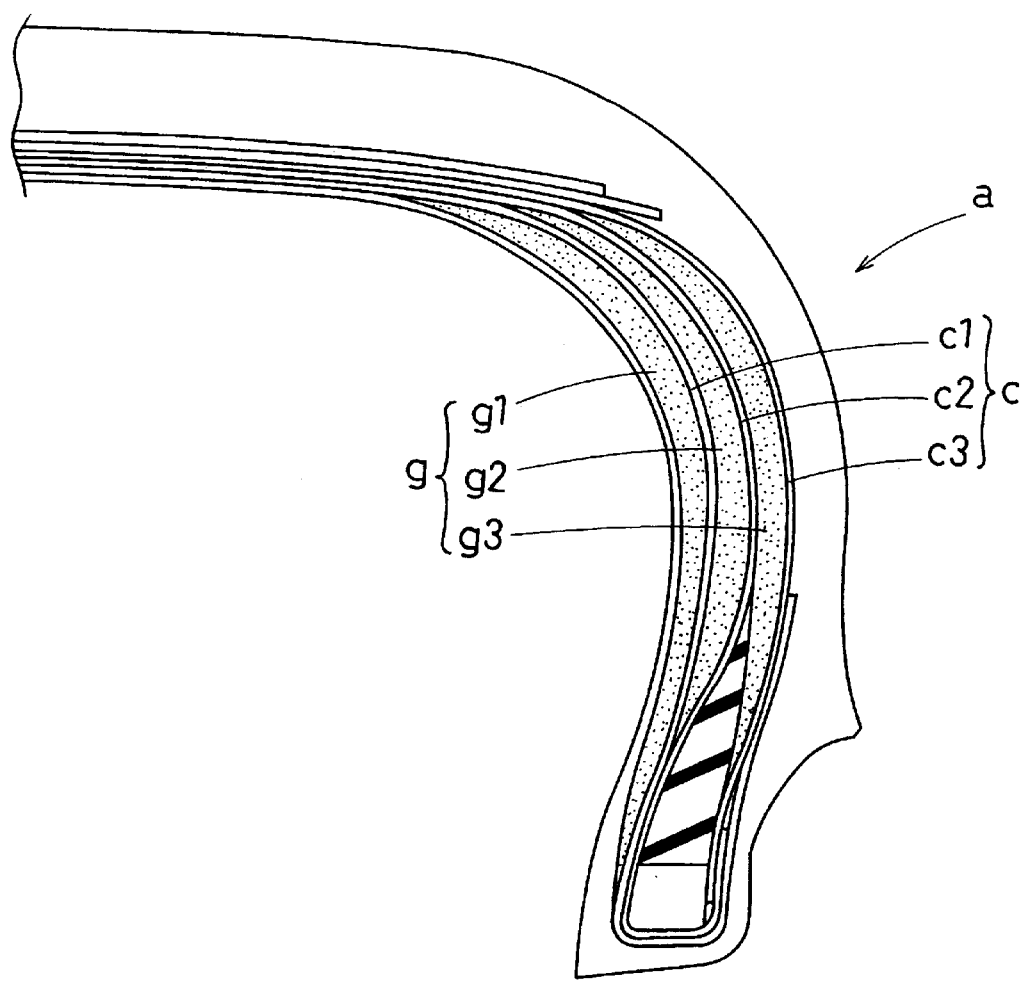
FIG. 4 is a cross sectional view a tire used in a comparison test as a reference tire.

| Tire Structure | Ex. 1 FIG. 2 | Ex. 2 FIG. 3 | Ref. FIG. 4 |
| --- | --- | --- | --- |
| Steel cord reinforcing layer | | | none |
| S1/Hm | 1.5 | 1.5 | — |
| S2 /Hm | 1.6 | 1.6 | — |
| Cord dia. (x Hm) | 0.006 | 0.006 | — |
| Cord count (/5cm) | 40 | 40 | — |
| Cord angle (deg.) | 22 | 22 | — |
| Axially inner reinforcing rubber layer Thickness Ta (mm) | 6.5 | 6.5 | 8 |
| Axially outer reinforcing rubber layer Thickness Tb (mm) | 5 | 5 | 7 |
| Runflat performance (index) | 100 | 100 | 100 |
| Tire weight (kg) | 12.5 | 12.5 | 13.1 |
| (difference) | −0.6 | −0.6 | 0 |

As apparent from the test results, the tire weight could be decreased by 0.6 kg while maintaining the runflat performance at the same level as the reference tire.

Aside from the passenger car tires, the present invention may be applied to light truck tires, truck/bus tires and the like.

The axially inner reinforcing rubber layer may be disposed on the inside of an inner liner which inner liner is provided along the inner surface of the carcass. Further, it is also possible to remove the inner liner by using a gas-impermeable rubber as the topping rubber for the carcass.

What is claimed is:

1. A runflat pneumatic tire comprising
   a tread portion,
   a pair of sidewall portions,
   a pair of bead portions each with a bead core and a bead apex therein,
   the bead apex made of rubber extending radially outwards from the bead core,
   a carcass extending between the bead portions and composed of an inside carcass ply and an outside carcass ply,
   the inside carcass ply extending between the bead portions through the tread portion and sidewall portions and turned up around the bead core in each bead portion from the inside to the outside of the tire so as to form a pair of turned up portions and a main portion therebetween,
   the outside carcass ply disposed outside the inside carcass ply and extending to a position between the bead apex and the turned up portion in each bead portion,
   each bead portion provided with a steel cord reinforcing layer comprising an axially inner portion and an axially outer portion which extend radially outwardly from the underside of the bead core along the axially inside and outside of the bead core, respectively,
   each sidewall portion provided with an axially inner reinforcing rubber layer and an axially outer reinforcing rubber layer,
   the axially inner reinforcing rubber layer disposed along the axially inner surface of the main portion of the inside carcass ply,
   the axially outer reinforcing rubber layer disposed between the outside carcass ply and the axially outer portion.

2. The runflat pneumatic tire according to claim 1, wherein the outside carcass ply and the axially outer portion of the steel cord reinforcing layer overlap with each other, and within the extent of the overlap therebetween, the axially outer reinforcing rubber layer is disposed to be sandwiched therebetween.

3. The runflat pneumatic tire according to claim 2, wherein
   in the overlap, the axially outer portion is axially outwards of the outside carcass ply.

4. The runflat pneumatic tire according to claim 2, wherein
   in the overlap, the axially outer portion is axially inwards of the outside carcass ply.

5. The runflat pneumatic tire according to claim 1, 2, 3 or 4, wherein
   the axially inner portion of the steel cord reinforcing layer extends up to a radial height S1 in a range of from 1.0 to 1.5 times the radial height Hm of the maximum tire section width position,
   the axially outer portion of the steel cord reinforcing layer extends up to a radial height S2 in a range of from 1.0 to 1.6 times the radial height Hm and more than the radial height S1, and the steel cord reinforcing layer is composed of a single ply of steel cords having a diameter of from 0.003 to 0.010 times the tire section height and arranged at an angle of from 15 to 55 degrees with respect to the tire circumferential direction and a cord count of from 30 to 45/5 cm.

* * * * *

UNITED STATES PATENT AND TRADEMARK OFFICE
CERTIFICATE OF CORRECTION

PATENT NO. : 6,609,550 B2
DATED : August 26, 2003
INVENTOR(S) : Kazuya Suzuki

It is certified that error appears in the above-identified patent and that said Letters Patent is hereby corrected as shown below:

<u>Title page,</u>
Please add the following priority information:

-- [30]   Foreign Application Priority Data

Sept. 08, 2000         (JP).......................2000-273495 --

Signed and Sealed this

Twenty-seventh Day of April, 2004

JON W. DUDAS
*Acting Director of the United States Patent and Trademark Office*